US010169735B2

(12) United States Patent
Lund et al.

(10) Patent No.: US 10,169,735 B2
(45) Date of Patent: Jan. 1, 2019

(54) CUSTOMIZED PACKAGING FOR UNMANNED AUTONOMOUS VEHICLE ITEM DELIVERY

(71) Applicant: QUALCOMM Incorporated, San Diego, CA (US)

(72) Inventors: Benjamin Lund, Escondido, CA (US); Michael Franco Taveira, San Diego, CA (US); Lael Pearce, San Diego, CA (US); Marcelo Ceribelli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 304 days.

(21) Appl. No.: 15/151,999

(22) Filed: May 11, 2016

(65) Prior Publication Data

US 2017/0300855 A1 Oct. 19, 2017

Related U.S. Application Data

(60) Provisional application No. 62/323,875, filed on Apr. 18, 2016.

(51) Int. Cl.
  *G06Q 30/00* (2012.01)
  *G06Q 10/08* (2012.01)
  (Continued)

(52) U.S. Cl.
  CPC ....... *G06Q 10/0832* (2013.01); *B64C 39/024* (2013.01); *B64F 5/0009* (2013.01);
  (Continued)

(58) Field of Classification Search
  CPC ..................................................... G06Q 30/06
  (Continued)

(56) References Cited

U.S. PATENT DOCUMENTS 9,305,280 B1 4/2016 Berg et al.
9,412,278 B1 * 8/2016 Gong .................... H04L 63/101
(Continued)

OTHER PUBLICATIONS

International Search Report and Written Opinion—PCT/US2017/018403—ISA/EPO—dated May 16, 2017.
(Continued)

*Primary Examiner* — Mila Airapetian
(74) *Attorney, Agent, or Firm* — Jae-Hiee Choi; The Marbury Law Group

(57) ABSTRACT

Various embodiments enable delivering an item using an unmanned autonomous vehicle (UAV) in response to receiving an electronic order for an item. Order parameters may be determined based on the electronic order identifying the item and details regarding delivery of the item. UAV components may be selected for operating the UAV based on UAV parameters meeting the order parameters. UAV-compliant packaging parameters may be determined for transporting the item carried by the UAV. Selected UAV-compliant packaging may enable the UAV to meet at least some of the order parameters and the UAV parameters. Assembly of the UAV may be coordinated to include the selected UAV components and selected UAV-compliant packaging with the item therein. The selected UAV-compliant packaging may meet the determined UAV-compliant packaging parameters. The assembled UAV and packaging may be dispatched for delivering the item.

30 Claims, 7 Drawing Sheets

(51) Int. Cl.
  *B64C 39/02*  (2006.01)
  *B64F 5/00*  (2017.01)
  *G06Q 30/06*  (2012.01)

(52) U.S. Cl.
  CPC ......... *G06Q 10/08* (2013.01); *G06Q 30/0635* (2013.01); *B64C 2201/066* (2013.01); *B64C 2201/108* (2013.01); *B64C 2201/127* (2013.01); *B64C 2201/128* (2013.01); *B64C 2201/145* (2013.01)

(58) Field of Classification Search
  USPC ....................................................... 705/26.1
  See application file for complete search history.

(56) References Cited

U.S. PATENT DOCUMENTS

| | | | |
|---|---|---|---|
| 2003/0083763 A1 | 5/2003 | Kiyohara et al. | |
| 2003/0200111 A1 | 10/2003 | Damji | |
| 2014/0032034 A1 | 1/2014 | Raptopoulos et al. | |
| 2015/0006005 A1* | 1/2015 | Yu | G06Q 10/08 701/22 |
| 2015/0120094 A1 | 4/2015 | Kimchi et al. | |
| 2015/0145158 A1 | 5/2015 | Levine et al. | |
| 2015/0298799 A1 | 10/2015 | Bertrand et al. | |
| 2015/0336671 A1 | 11/2015 | Winn et al. | |
| 2016/0070264 A1 | 3/2016 | Hu et al. | |
| 2016/0159471 A1* | 6/2016 | Chan | B64C 39/024 244/39 |
| 2016/0196525 A1* | 7/2016 | Kantor | G08G 5/0013 705/330 |
| 2017/0253354 A1* | 9/2017 | Colson | B29C 64/386 |
| 2017/0286892 A1* | 10/2017 | Studnicka | G06Q 10/083 |

OTHER PUBLICATIONS

Williams M., "The US Navy is 3D-Printing Custom Drones on its Ship," IDG News Service, Jul. 29, 2015, p. 1.

* cited by examiner

CUSTOMIZED PACKAGING FOR UNMANNED AUTONOMOUS VEHICLE ITEM DELIVERY

RELATED APPLICATIONS

This application claims the benefit of priority to U.S. Provisional Patent Application 62/323,875 entitled "Customized Packaging for Unmanned Autonomous Vehicle Item Delivery," filed Apr. 18, 2016, the entire contents of which are incorporated herein by reference.

BACKGROUND

When transporting or delivering products, shipping agents choose containers such as cardboard boxes based on standard sizes for shipping via trucks, planes, and/or boats. Often the shipping agents pack those containers with protective cushioning materials, such as air bags or popcorn, but too often, those protective cushioning materials are excessive and needed only because the standard container is far bigger than the contents therein. Labeling requirements, human handling requirements, and cargo protection are just some of the reasons that small cargo is shipped in oversized containers. Shipping with such oversized containers is inefficient and particularly when delivering products via an unmanned autonomous vehicle (UAV).

SUMMARY

Various embodiments include methods of delivering an item using a UAV including receiving an electronic order for an item. Various embodiments may include determining order parameters based on the electronic order identifying the item and details regarding delivery of the item, selecting UAV components for operating the UAV based on UAV parameters meeting the order parameters, determining UAV-compliant packaging parameters for transporting the item carried by the UAV, coordinating assembly of the UAV to meet at least some of the order parameters and the UAV-compliant packaging parameters, and dispatching. The UAV-compliant packaging may form part of the assembled UAV used for delivering the item. Assembly of the UAV may be coordinated to include the selected UAV components and selected UAV-compliant packaging with the item therein. The selected UAV-compliant packaging may meet the determined UAV-compliant packaging parameters.

Some embodiments may include determining dimensions of the item in which UAV-compliant packaging parameters may be based on the determined dimensions of the item, and shaping the UAV-compliant packaging to conform to the determined dimensions of the item. In some embodiments, assembling the UAV may include adjusting a packaging structure of the UAV-compliant packaging to meet flight specifications for the UAV. In some embodiments, adjusting the packaging structure may further include applying an altering agent to a material portion of the packaging structure, in which the altering agent may be selected from a group consisting of electromagnetic energy, temperature, mechanical energy, electrical energy, magnetic energy, or chemical energy.

In some embodiments, adjusting the packaging structure may further include applying an altering agent to a material portion of the packaging structure and pressing the item into the material portion to conform the packaging structure to a shape of the item. In some embodiments, adjusting the packaging structure may further include changing a shape of a material forming the UAV-compliant packaging, in which the material may be configured to hold the changed shape of the material forming the UAV-compliant packaging to conform to the selected UAV components. In some embodiments, adjusting the packaging structure may further include changing a shape of a material forming the UAV-compliant packaging, in which the material may be configured to hold the changed shape of the material forming the UAV-compliant packaging to conform to an aerodynamic profile.

In some embodiments, the UAV-compliant packaging may be formed at least in part using three-dimensional (3-D) printing methods. In such embodiments, the UAV-compliant packaging may be configured to be melted and reused in a 3D printer for reforming another UAV-compliant packaging.

In some embodiments, a received electronic order may include more than one item, and the UAV-compliant packaging may be selected to contain the more than one item included in the received electronic order.

In some embodiments, the UAV-compliant packaging may include UAV elements selected from a group consisting of pre-printed circuit components, and mating elements for securing the UAV-compliant packaging to one or more UAV components. In some embodiments, the UAV-compliant packaging may include at least one of the selected UAV components.

Some embodiments may include determining whether the item includes pre-supplied packaging, and determining whether the pre-supplied packaging meets the determined UAV-compliant packaging parameters in response to determining the item includes the pre-supplied packaging. The selected UAV-compliant packaging may include the pre-supplied packaging in lieu of added packaging elements in response to determining the pre-supplied packaging meets the determined UAV-compliant packaging parameters.

In some embodiments, selecting UAV-compliant packaging for transporting the item carried by the UAV may include selecting packaging to protect the item from a predetermined environment associated with the delivery of the item. In some embodiments, selecting UAV-compliant packaging for transporting the item carried by the UAV may include selecting packaging to handle at least one selected mode of travel and a travel route. In some embodiments, selecting UAV-compliant packaging for transporting the item carried by the UAV may include selecting packaging to include an airfoil-shaped profile. In some embodiments, selecting UAV-compliant packaging for transporting the item carried by the UAV may include selecting packaging a plurality of UAV-compliant packages formed to collectively contain the item. In some embodiments, selecting UAV-compliant packaging for transporting the item carried by the UAV may include selecting packaging formed at least partially from a frozen liquid.

In some embodiments, the order parameters may be selected from a group consisting of a timing of delivery, when the electronic order was placed, where the electronic order was placed, when delivery of the item is expected, when delivery of the item is guaranteed, one or more locations of delivery, a travel route for delivery, current weather conditions, predicted weather conditions, travel time, a perishability of the item, a required item protection, one or more types of packaging, a desired item protection, a monetary value of the item, and a cost to deliver the item. The order parameters may specify when the UAV is assembled prior to delivery. A destination for delivery of the item in the received electronic order may be selected to transport the item between commonly owned or controlled locations. Some embodiments may include manufacturing or assembling parts to form at least one of the selected UAV components.

Further embodiments include a processor configured to execute operations of the methods summarized above. Further embodiments include means for performing functions of the methods summarized above. Further embodiments include a non-transitory processor-readable storage medium having stored thereon processor-executable instructions configured to cause a processor to perform operations of the methods summarized above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of the claims.

DETAILED DESCRIPTION

Figure 1:
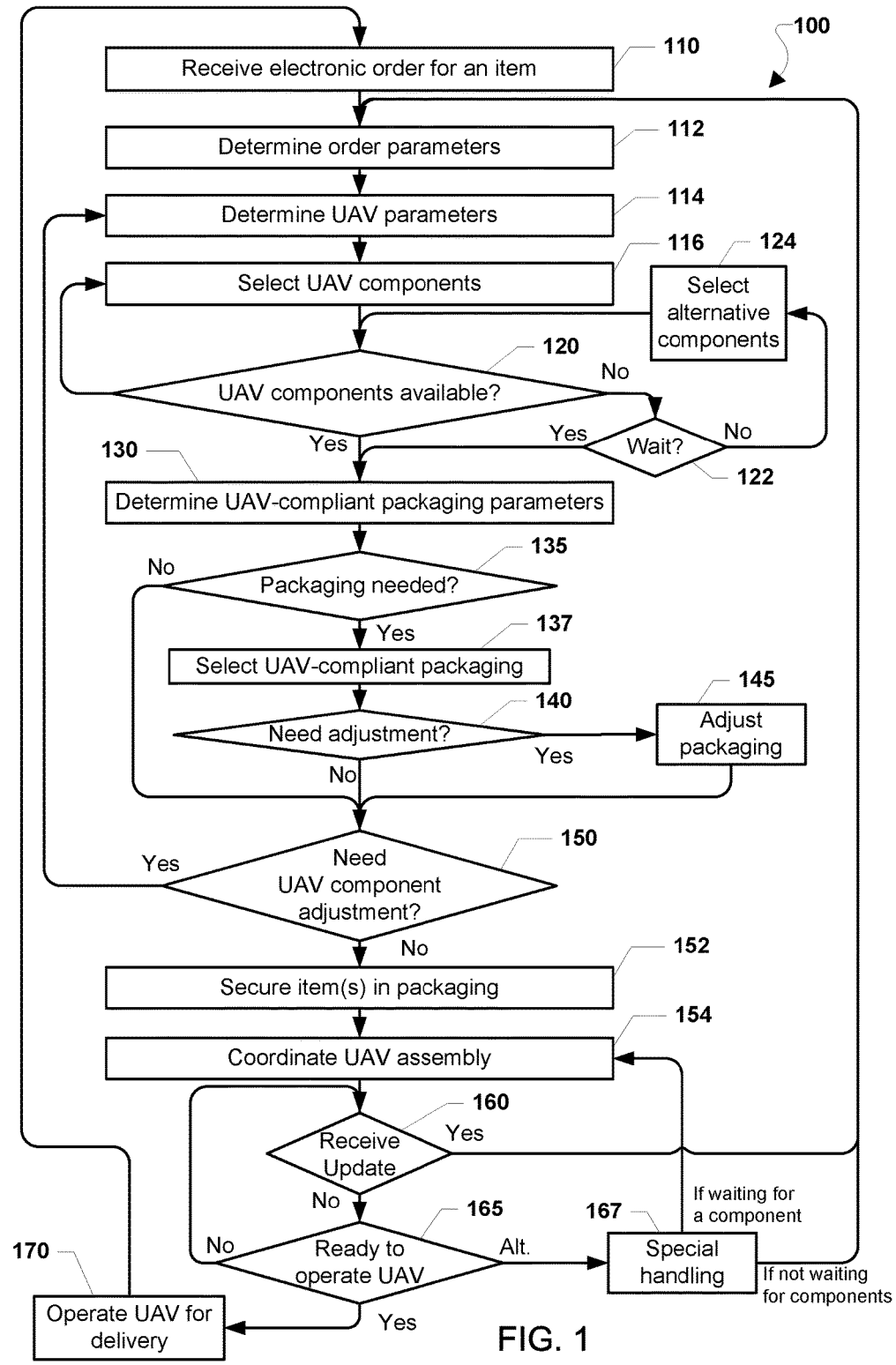
FIG. 1 is a process flow diagram illustrating a method of delivering an item using a UAV according to various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include a method of delivering an item using an unmanned autonomous vehicle (UAV). An electronic order for an item may be received by a processor, which allows order parameters to be determined that identify the item and a delivery destination. Based on the determined order parameters, UAV compliments may be selected for operating the UAV. Additionally, a UAV-compliant packaging may be selected for transporting the item while carried by the UAV. The UAV-compliant packaging may be selected to meet the order parameters. Once the UAV-compliant packaging is selected, the item place therein, and the UAV assembled with the selected UAV components and the selected UAV-compliant packaging, the UAV is ready to operate for delivering the packaging with the item therein.

The term "unmanned autonomous vehicle" (or "UAV") is used herein to refer to one of various types of autonomous vehicles (e.g., autonomous aircraft, land vehicles, waterborne vehicles, or a combination thereof) that may not utilize onboard, human pilots. A UAV may include an onboard computing device configured to operate the UAV without remote operating instructions (i.e., autonomously), such as from a human operator or remote computing device. Alternatively, the onboard computing device may be configured to operate the UAV with remote operating instruction or updates to instructions stored in a memory of the onboard computing device. The UAV may be propelled for movement in any of a number of known ways. For example, a plurality of propulsion units, each including one or more propellers or jets, may provide propulsion or lifting forces for the UAV and any payload (e.g., item(s) for delivery) carried by the UAV for travel or movement. In addition or alternatively, the UAV may include wheels, tank-tread, floatation devices, or other non-aerial movement mechanisms to enable movement on the ground, across water, or under water. Although the UAVs 200, 201, 202, 207 illustrated in FIGS. 2, 3, 7A, 7B, 8A, and 8B are aerial UAVs, the embodiments are not limited to aerial vehicles and may be implemented in or on any type of UAV. Various embodiments are described with reference to a UAV, particularly an aerial UAV, for ease of reference. However, the description of any particular UAV is not intended to limit the scope of the claims to unmanned aerial vehicles. Further, the UAV may be powered by one or more types of power source, such as electrical, chemical, electro-chemical, or other power reserve, which may power the propulsion units, the onboard computing device, and/or other onboard components.

As used herein, the term "electronic order" refers to an electronic request or agreement placed for at least one item, including sufficient details to arrange delivery of the at least one item. An item includes any good, merchandise, product, material, and other individual thing that may be delivered by a UAV. An electronic order may include a transaction description, as well as a description of the item, the quantities requested/purchased, unit prices, item origin and delivery locations, required lead time for delivery, and the terms of agreement included as part of the electronic order.

As used herein, the term "order parameters" refers to information that may pertain to an electronic order, including item(s) to be delivered, a destination for delivery, delivery or mission requirements, etc. Order parameters may include information obtained directly and indirectly from the electronic order. For example, mission parameters may include information for effecting delivery of the order, which may be determined indirectly from the electronic order. Such mission parameters are included within the term order parameters. Thus, order parameters may include information selected from a group including a timing of delivery, when and/or where the electronic order was placed, when delivery of the item is expected, when delivery of the item is guaranteed, one or more locations of delivery, a travel route for delivery, current weather conditions, predicted weather conditions, travel time, a perishability of the item, a required item protection, one or more types of packaging (required or desired), a desired item protection, a monetary value of the item, a cost to deliver the item, and other contextual information that may affect the delivery of an item in the electronic order. The cost to deliver the item may take into account an opportunity cost of delivering an item now versus waiting for a future order (e.g., that might have priority or be combined with another order to a nearby location or risk delivering in current weather or time of day). In addition, order parameters may include (but is not limited to) mission information identifying more than one destination, a route to each destination, map or travel directions, directions of travel, how the UAV will travel (e.g., air, land, and/or sea), chances of success and/or failure, timing information relating to each destination, and the like. In addition, order parameters may include route details, distance, travel speed(s), flight restrictions along a route, obstacles, permissions, or other information that may be useful for traveling, landing, fueling, recharging, and assisting the UAV in reaching a destination. Further, the order parameters may include delivery information, such as hazards to avoid, details regarding how delivery should be made (e.g., drop from height, land and wait, land and release, etc.), and/or proper delivery verification information. Proper delivery verification information may include security information and/or enable recognition of a drop zone or other visual recognition information (e.g., facial recognition corresponding to a recipient or landmark/signage recognition).

Figure 9:
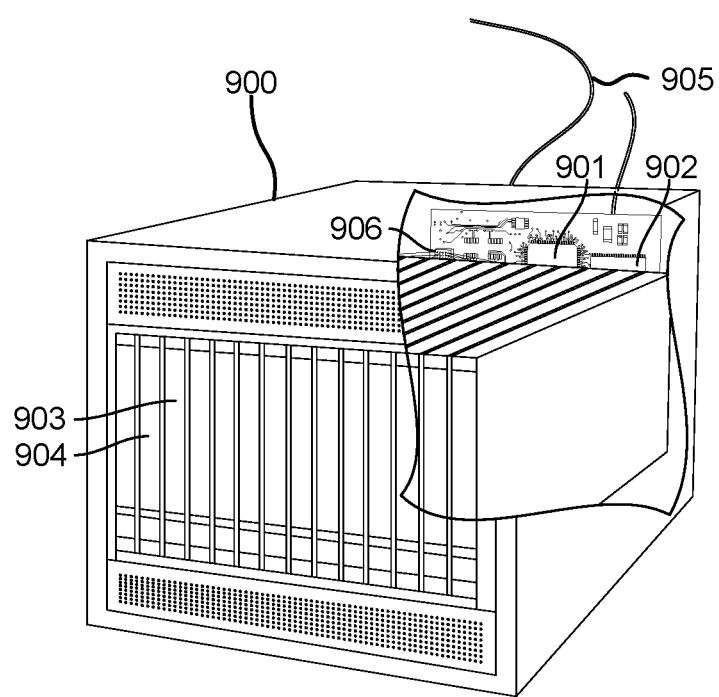
FIG. 9 is a component diagram of server suitable for use with various embodiments.

The term "computing device" is used herein to refer to an electronic device equipped with at least a processor. Examples of computing devices may include UAV travel control and/or mission management computers, mobile devices (e.g., cellular telephones, wearable devices, smartphones, smartwatches, web-pads, tablet computers, Internet enabled cellular telephones, Wi-Fi® enabled electronic devices, personal data assistants (PDAs), laptop computers, etc.), personal computers, and server computing devices. In various embodiments, computing devices may be configured with memory and/or storage as well as networking capabilities, such as network transceiver(s) and antenna(s) configured to establish a wide area network (WAN) connection (e.g., a cellular network connection, etc.) and/or a local area network (LAN) connection (e.g., a wired/wireless connection to the Internet via a Wi-Fi® router, etc.). Examples of computing devices suitable for use with various embodiments are described with reference to FIG. 9.

The term "server" as used herein refers to any computing device capable of functioning as a server, such as a master exchange server, web server, and a personal or mobile computing device configured with software to execute server functions (e.g., a "light server"). Thus, various computing devices may function as a server, such as any one or all of cellular telephones, smart-phones, web-pads, tablet computers, Internet enabled cellular telephones, Wi-Fi® enabled electronic devices, laptop computers, personal computers, and similar electronic devices equipped with at least a processor, memory, and configured to receive electronic orders and communicate with a UAV. A server may be a dedicated computing device or a computing device including a server module (e.g., running an application that may cause the computing device to operate as a server). A server module (or server application) may be a full function server module (or server application), or a light or secondary server module (e.g., light or secondary server application). A light server or secondary server may be a slimmed-down version of server type functionality that may be implemented on a personal or mobile computing device thereby enabling the light or secondary server to function as an Internet server (e.g., an enterprise e-mail server) to a limited extent, such as necessary to provide the functionality described herein. Examples of servers suitable for use with various embodiments are described with reference to FIG. 9.

Various embodiments include a system and/or method combining a UAV and packaging of one or more items, carried as cargo (i.e., a payload) by the UAV, together as one delivery system. A configuration of one or both of the UAV and the packaged item may be configured based on input variables from an electronic order. UAV components (e.g., parts, accessories, enhancements, etc.) may be selected based on the electronic order, which may include order parameters such as item characteristics and delivery details. The order parameters, which may also control which UAV components are selected, may be based on when, where, and how the one or more items should be delivered, how the UAV should travel to deliver a specific item, and may include a route, flight time, chance of inclement weather, temperature, required or estimated time of arrival, etc. The item characteristics may include size, weight, value, resistance to elements, resistance to temperature, and material/structural properties. Using the input variables, a UAV may be customized to include item-specific packaging and UAV components selected to function as one delivery system. The customization may be performed shortly before departure on a delivery mission. Various embodiments enable the UAV, including UAV components, and the packaging to be configured and sized to a particular mission, rather than developing a variety of standardized, but not customized packages and UAV's.

FIG. 1 is a process flow diagram illustrating a method 100 of delivery an item using a UAV in accordance with various environments. The method 100 may be performed by a processor, a computing device, or a server (e.g., illustrated in FIG. 9). For ease of description the various embodiments are described with reference to a "processor."

In block 110, a processor may receive one or more electronic orders for items. Each electronic order may be for one or more items. Each electronic order, including the information contained therein, may be received by the processor from a computing device with relevant data, such as an ordering server including a database, or another computing device. The electronic order may be pushed to the processor (i.e., passive receipt), pulled by the processor (i.e., actively requested and/or accessed), or some combination thereof. The ordering server or other computing device may receive data electronically from various sources including buyers, sellers, manufacturers, distributors, or one or more third parties involved in presenting, coordinating, and/or managing such transactions. Information related to the electronic order may include details of a transaction, such as when the transaction was made, identifying the parties to the transaction (e.g., buyer/seller, sender/recipient, etc.), or at least details for delivery of at least one item from one location to another (i.e., without a transfer of ownership). An electronic order may require delivery of an item from a buyer to a seller. Alternatively, an electronic order may move an item between commonly owned locations (e.g., between facilities or between locations within a one facility). Various embodiments consider, for example, the nature of the item being delivered, the context of an electronic order requesting the delivery, where and when the item is being requested from, where and when the item needs to be delivered, and the state in which the item should be delivered (e.g., a temperature range for one or more temperature sensitive items).

In block 112, the processor may determine order parameters based on the one or more electronic orders. The order parameters for each electronic order may identify, for instance, the item, transactional details, and details regarding time and place of delivery of the item. The processor may determine order parameters directly from the electronic order(s) or by performing a lookup in one or more databases. For example, order parameters may be obtained through a query coordinated through an application that may be executing on or from the processor. Thus, physical item characteristics, item value, travel considerations, delivery costs, or other details may be determined from the electronic order(s), from a look up (e.g., using an item identifier) in a product database, or from a remote source with reference to the electronic order as part of determining the order parameters.

Physical item characteristics may describe the item(s) including a weight and dimensions of the item(s) or product packaging that comes with the item(s). In addition, the physical item characteristics may describe material/structural properties, one or more values of the item(s), whether each item consists of more than one item, whether the item(s) is/are to be delivered with another separate item, or whether the item(s) is/are fragile, need(s) special handling, is/are perishable (e.g., food, organs, or other organic items), is/are time sensitive, require(s) physical or security protection, is/are combustible, or is/are sensitive/resistant to certain environments (hot, cold, humid, wet, dry, windy, ultraviolet light, etc.). The physical item characteristics may be provided by any party to the transaction, including a third party, such as the item manufacturer or distributor. Often such information may be provided by a seller when an electronic order is part of a buyer/seller transaction. Buyers may additionally or alternatively provide the information as part of request for the item, such as in a wanted ad. As a further alternative, each electronic order may only identify the item with sufficient information for the processor to lookup the physical item characteristics in one or more other databases.

Travel considerations may include current weather conditions (e.g., temperature, precipitation, winds, storms, etc.), predicted weather conditions, energy/fuel requirements, recharging/refueling requirements, travel restrictions, dispatching facility information, a required, desired and/or selected mode of travel (e.g., by land, air, sea), one or more intermediate stops (i.e., layovers), emergency/alternate travel routes/stops, destination information, and/or dynamic delivery considerations such as a moving destination. A UAV may deliver, retrieve, and/or transfer an item to/from a moving destination, such as a train, boat, aerial vehicle, truck, bus, car, and/or other motor vehicle.

Other order parameters may include temporal values, such as when and/or where the electronic order was placed, when the item is available to be sent, when delivery of the item is expected, when delivery of the item is guaranteed, how long it will take to deliver the item, and/or when the UAV needs to be dispatched for a timely delivery.

In block 114, the processor may determine UAV parameters that are suitable for delivering the item(s), based (at least) on the determined order parameters. As part of determining UAV parameters, the processor may determine whether multiple separate electronic orders may be combined for delivery to the same destination or share transportation along part of a travel route. An initial determination regarding the UAV parameters, immediately following the determination of order parameters in block 112, may act as a preliminary determination that may be adjusted after determinations regarding UAV-compliant packaging in blocks 130, 145, special handling in block 167, and determination blocks 135, 140, 150. Thus, there may be interplay or some compromise between finally determined UAV parameters and finally determined packaging parameters suited to efficiently deliver the item(s).

The determined UAV parameters may include a list of UAV components desired or needed for operating a UAV capable of delivering the item. Such a list of UAV components may include UAV parts for a custom configured UAV. The UAV components may include electronics (e.g., electronic speed controllers), one or more motors, rotors, a power supply, a frame or frame elements, landing gear, cargo restraints, and the like. The determined UAV parameters may include a selection of UAV components that may be manufactured on demand, such as through three-dimensional (3-D) printing, or assembled from separate parts.

In block 116, the processor may select (or otherwise identify) UAV components (e.g., motors, electronic speed controllers, propellers, frame components, one or more electronic modules, etc.) for operating the UAV based on the determined UAV parameters, which meet the determined order parameters. Initially, the selected UAV components may include a list of desired or optimal UAV components. If one or more of the selected UAV components are subsequently determined to be unavailable, alternate components may be selected in block 124.

In determination block 120, a processor may determine whether the list of UAV components, determined from the UAV parameters in block 114, are available.

In response to determining that one or more elements on the list of UAV components is not available (i.e., determination block 120="No"), the processor may determine whether to wait for the one or more unavailable components in determination block 122. Waiting may allow time for delivery of the one or more unavailable components, or for the one or more unavailable components to otherwise become available. For example, the one or more unavailable components may be delivered by another UAV, which may have used the one or more unavailable components and/or merely transported the one or more unavailable components for delivery to the subject UAV. Alternatively or additionally, waiting may allow time for the one or more unavailable components to be manufactured (e.g., 3D printing). The temporal values determined in the order parameters may inform the decision whether to wait for the one or more components. For example, if the order is not a rush and/or the waiting period is not very long, the processor may decide waiting is appropriate.

In response to determining not to wait for one or more components (i.e., determination block 122="No"), the processor may select alternative components in block 124. Following the selection of alternative components in block 124, the processor may again determine whether the alternative UAV components are available in determination block 120.

In response to determining that all of the elements on the lists of UAV components are available (i.e., determination block 120="Yes") or that the processor may wait for any of unavailable components (i.e., determination block 122="Yes"), the processor may determine UAV-compliant packaging parameters in block 130. The UAV-compliant packaging parameters determined in block 130 may include a list of requirements and/or constraints, desired or needed, so that the intended item(s) may be delivered efficiently and affordably by a UAV. In particular, the determined UAV-compliant packaging parameters may include requirements and/or constraints based on determined dimensions of the item and/or the determined UAV parameters in block 114. The UAV-compliant packaging parameters may include packaging dimensions, weight, materials, material properties, material changeability, and/or compatibility with one or more select UAVs. The UAV-compliant packaging parameters may include using packaging and/or the item, in whole or in part, as one or more components required or desired for the UAV. For example, the packaging may include one or more UAV components (e.g., an extra power supply) intended to be left at the delivery destination along with an item. The UAV-compliant packaging parameters may include package characteristics configured to protect the item being delivered from a predetermined environment (e.g., hot, cold, humid, wet, etc.) likely to be encountered. For example, for an item expected to be transported through a hot environment, packaging may be selected that is formed at least partially from a frozen liquid or a light-weight insulator. Although packaging formed from a frozen liquid may be heavy, the frozen liquid may be expected to melt during travel, which may reduce the weight of the packaging as the packaging melts.

In determination block 135, the processor may determine whether the item(s) needs packaging. Often, items being shipped include pre-supplied packaging. As used herein, the term "pre-supplied packaging" refers to a wrapper or container that covers or holds one or more items and which the manufacturer or another third party included to be sold or conveyed with the one or more items. Such pre-supplied packaging may meet requirements for delivering the item(s). Traditional shipping methods account for human handling and other unexpected events that occur during transport and warehousing, which may require added padding and/or protection for items. In contrast, UAV-based delivery methods may avoid the conventional human handling mishaps that damage items. Thus, pre-supplied packaging, which may not be sufficient for shipping that includes conventional human handling (e.g., manual loading/unloading from a delivery vehicle), may be sufficient for transport by a UAV as long as such pre-supplied packaging meets the UAV-compliant packaging parameters.

In response to determining that packaging is needed (i.e., determination block 135="Yes"), the processor may select UAV-compliant packaging in block 137. The selected UAV-compliant packing may be selected based on the determined UAV-compliant packaging parameters.

In determination block 140, the processor may determine whether the selected packaging requires adjustment of the packaging structure. Adjustments of the packaging structure may include changes to size or shape of the packaging in order to meet the UAV-compliant packaging parameters. Also, adjustments may include changes to size or shape in order to conform the packaging to a shape of all or part of the item being delivered.

In response to determining that the selected UAV-compliant packaging needs to be adjusted (i.e., determination block 140="Yes"), the processor may issue commands or otherwise take action to have the packaging adjusted accordingly in block 145.

In response to determining that no additional packaging is needed (i.e., determination block 135="No"), determining that no adjustments are needed to the selected packaging (i.e., determination block 140="No"), or after the selected packaging is adjusted in block 145, the processor may determine whether the selected UAV components need to be adjusted in determination block 150. The determination in determination block 150 provides an opportunity for the processor to reassess and determine whether there is a need to adjust the UAV parameters previously determined in block 114 based on the determinations regarding the UAV-compliant packaging.

In response to determining that adjustments are needed to the list of selected UAV components (i.e., determination block 150="Yes"), the processor may again determine UAV parameters in block 114, but this time taking into account the determined UAV-compliant packaging parameters.

In response to determining that no adjustments are needed to the selected UAV components (i.e., determination block 150="No"), the processor may initiate procedures for securing the item or items in the packaging (e.g., placing the item(s) in the packaging) in block 152. Securing the item(s) may be done manually by a human (e.g., worker at a fulfillment center) or autonomously by a machine or the like.

With the items secured in UAV-compliant packaging, the processor may coordinate the assembly of the UAV, including the selected UAV components and the selected UAV-compliant packaging with the item(s) therein in block 154.

In determination block 160, the processor may determine whether any electronic order updates have been received. Electronic order updates may include changes to all or part of the information related to the electronic order received in block 110. For example, electronic order updates may include changes to the quantity of items being delivered, details for delivery, where and when the item needs to be, delivery route, delivery conditions (e.g., weather change), or other order information that may affect delivery. Alternatively, a received order update may indicate special handling or attention is needed regarding a particular electronic order, UAV parameters, UAV components, UAV-compliant packaging parameters, etc.

In response to determining that an electronic order update has been received (i.e., determination block 160="Yes"), the processor may once again determine order parameters (i.e., in case the order parameters changed based on the received electronic order update) in block 112. In response to determining that an electronic order update has not been received (i.e., determination block 160="No"), the processor may determine whether the UAV is ready to operate in determination block 165.

In determination block 165, the processor may determine whether the UAV is ready to operate and begin its mission for delivering the item. This determination may ensure that all UAV components have been assembled on the UAV and that the item with its packaging is properly secured therewith. Alternatively or additionally, the processor may decide waiting is appropriate when a weather forecast or time of day may make travel difficult. For example, regional conditions may be very windy during a particular time of day (e.g., afternoons) or transporting packages at night may avoid vandalism or theft. A decision to wait may mean the UAV is not ready to operate.

In response to determining that the UAV is not ready to operate (i.e., determination block 165="No"), the processor may enter a waiting cycle in which the processor may again determine whether an electronic order update has been received in determination block 160 and whether the UAV is ready to operate in determination block 165, until either an electronic order update is received (i.e., determination block 160="Yes") or the UAV is ready to operate (i.e., determination block 165="Yes"). During such a waiting cycle, the processor may continuously, periodically, or at other intervals make the determinations in one or both of determination block 160 and determination block 165.

Alternatively, in response to determining that the UAV is not ready to operate, the processor may additionally determine that there is a need for special handling (i.e., determination block 165="Alt."), which may be provided in block 167. For example, the processor may determine that further investigation is needed regarding why the UAV is not ready to operate. The processor may determine that there is a need for special handling in response to a waiting cycle lasting more than a threshold period, execution of a threshold number of waiting cycles, receipt of an indication that further investigation is needed or some action(s) need to be taken, or based on other criteria.

In block 167, if the processor is waiting for an unavailable component (i.e., determination block 122="Yes"), the processor may check whether that component has become available and coordinate UAV assembly in block 154 if that component has become available. As a further option in block 167, if the processor is not waiting for an unavailable component, the processor may treat the indication of the need for special handling like receipt of an electronic order update (i.e., determination block 160="Yes") and again determine order parameters in block 112.

In response to determining that the UAV is ready to operate (i.e., determination block 165="Yes"), the processor may dispatch the assembled UAV in block 170 for operation to deliver the item according to the electronic order and the determined order parameters. Once the assembled UAV is dispatched along with the item for delivery in accordance with the electronic order, the processor may await receipt of another electronic order for an item in block 110 as described.

Figure 2:
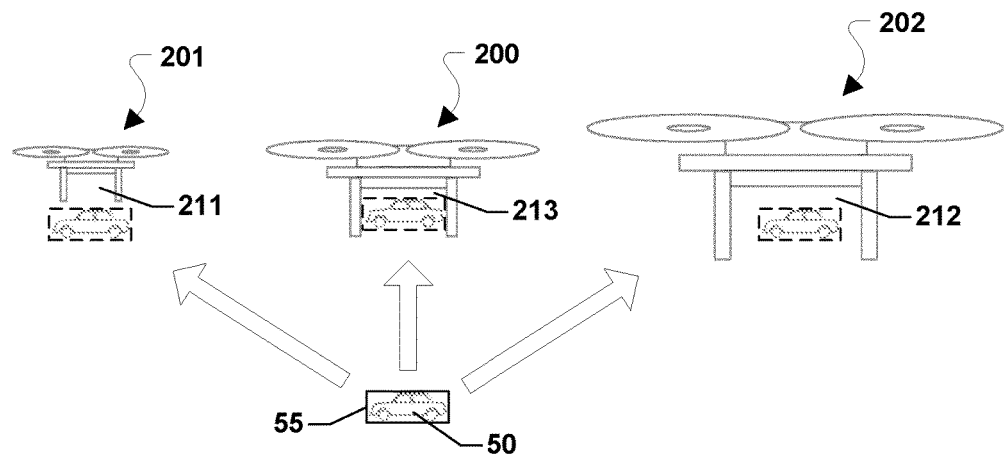
FIG. 2 is a schematic diagram illustrating a selection of UAV components according to various embodiments.

In various embodiments, UAV components may be selected for operating a UAV 200, 201, 202, as illustrated in FIG. 2. With reference to FIGS. 1-2, three UAVs 200, 201, 202 are illustrated as possible selections for delivering an item 50 and the item's packaging 55 (e.g., pre-supplied packaging). In this illustrative example, each of the three UAVs 200, 201, 202 include components of various sizes that conform to the size of their respective UAVs 200, 201, 202. The left UAV 201 is the smallest, the right UAV 202 is the largest, and the center UAV 200 is in between the size of the left UAV 201 and the right UAV 202. Otherwise, the three UAV's 200, 201, 202 may be similar to one another. Components of the left UAV 201 form a small package receiving area 211, in which the item's packaging 55 does not fit. Components of the right UAV 202 form a second package receiving area 212, in which the item's packaging 55 is too small and would require additional elements to be secured safely therein. In contrast, components of the center UAV 200 form an intermediate package receiving area 213 that snugly fits the item's packaging 55. Thus, all of the UAV components that form the center UAV 200 may be selected for best operating the UAV based on order parameters that include delivering the item 50 in the item's packaging 55.

Figure 3:
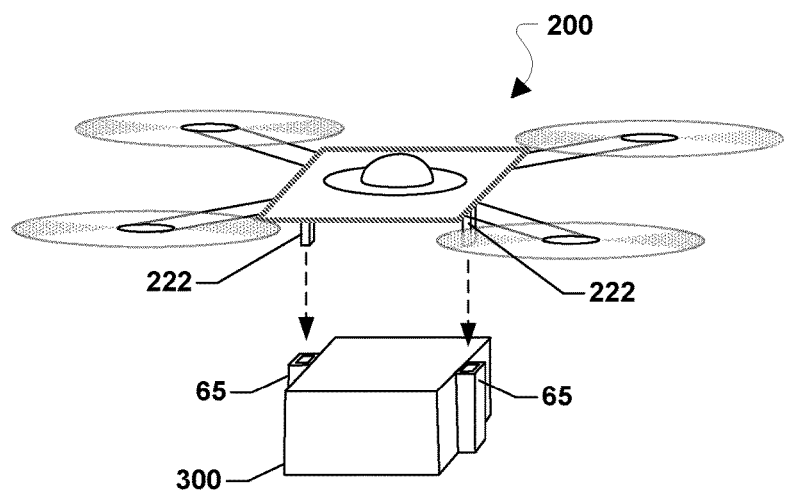
FIG. 3 is a perspective view of a UAV-compliant packaging for securing to UAV components according to various embodiments.

In various embodiments, UAV-compliant packaging may be selected for transporting an item (e.g., 50 in FIG. 2), as illustrated in FIG. 3. With reference to FIGS. 1-3, the UAV 200 includes mating elements 222 for receiving and securing UAV-compliant packaging 300. The UAV-compliant packaging 300 includes sleeves 65 configured to receive the mating elements 222 protruding from the UAV 200. Alternatively, the UAV 200 may include one or more apertures for receiving protruding mating elements included in the UAV-compliant packaging 300.

Figure 4A:
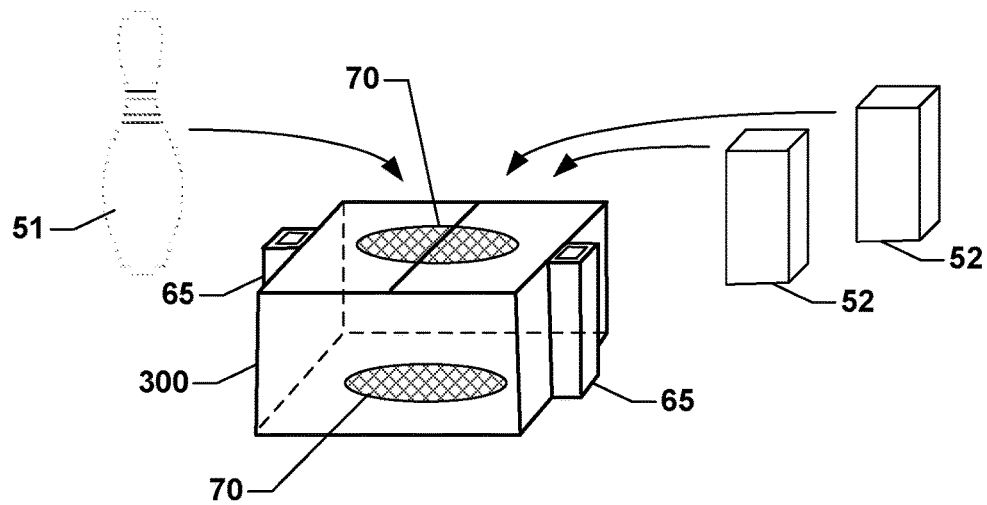
FIG. 4A is a perspective view of a treated UAV-compliant packaging for receiving items to be packed in the UAV-compliant packaging in accordance with various embodiments.
Figure 4B:
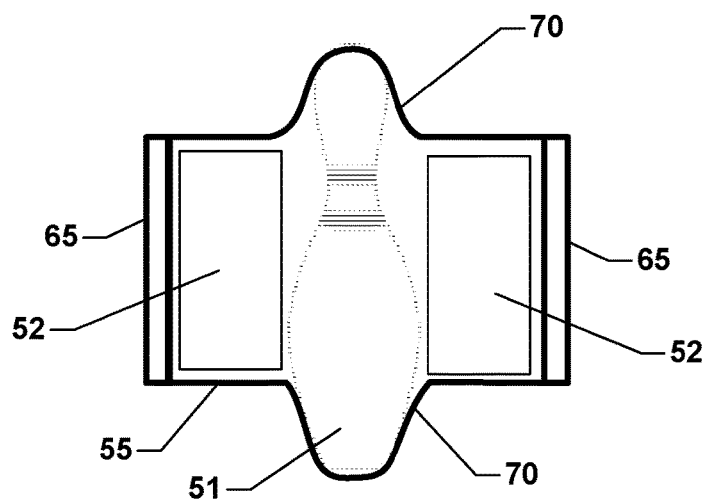
FIG. 4B is a perspective view of the treated UAV-compliant packaging and items in FIG. 4A with the items packed inside the UAV-compliant packaging in accordance with various embodiments.

In various embodiments, the UAV-compliant packaging 300 may be adjusted to meet flight specifications for the UAV (e.g., 200), the order parameters, and/or to reduce an outer profile of the UAV-compliant packaging 300 as illustrated in FIG. 4B. With reference to FIGS. 1-4B, the UAV-compliant packaging 300 is illustrated along with a bowling pin 51 and two additional items 52 included in an electronic order. In accordance with various embodiments, dimensions of the bowling pin 51 and the two additional items 52, separate from the UAV-compliant packaging 300 (e.g., as illustrated in FIG. 4A), may be determined and used to appropriately select the UAV-compliant packaging 300. In this instance, the UAV-compliant packaging 300 includes UAV compatible elements, such as the sleeves 65 or material portions 70 that may change shape.

In various embodiments, the UAV-compliant packaging 300 may include two opposed material portions 70 that are configured to change shape. For example, the material portions 70 may be flexible and stretchable. Alternatively, an altering agent or condition (e.g., temperature) may be applied to one or more of the material portions 70 that activates a shape changing property of the material. In the example shown (e.g., in FIG. 4B), opposite ends of the bowling pin 51 have been pressed into the material portions 70 causing the material portions 70 to form and change shape to conform to that of the bowling pin 51.

Various packaging materials and materials used for UAV construction and operation that can change shape and hold the changed shape may be used in some embodiments. Many of such materials may hold a shape until affected by application of an altering agent or condition (e.g., temperature) that allows or prompts the material to change shape. For example, photostrictive materials change shape when exposed to light (i.e., electromagnetic energy), thermostrictive materials change shape when exposed to certain temperatures, electroactive materials change shape when exposed to an electrical field (i.e., electrical energy), magnetostrictive materials change shape when exposed to a magnetic field (i.e., magnetic energy), and chemostrictive materials change shape when exposed to particular chemicals or a certain chemical environment (i.e., chemical energy). Such shape-changing materials may reversibly change their shape and/or dimensions in response to one or more stimuli or external influences. The effect of light, temperature, pressure, and electric or magnetic field, or a chemical stimulus may be used to activate the shape changing properties of the material. Many of these materials may change shape without changing dimensions, while some materials may retain their shape but change their dimensions, and yet other material may change both parameters.

Figure 5:
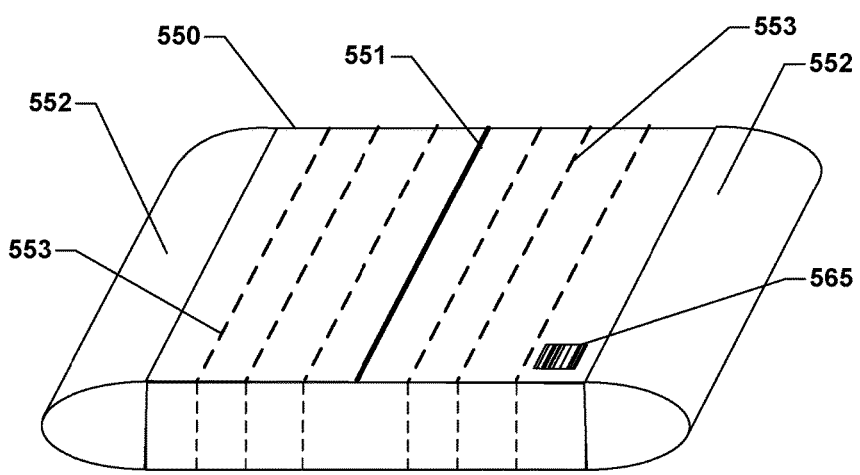
FIG. 5 is a perspective view of a UAV-compliant packaging according to various embodiments.

In various embodiments, UAV-compliant packaging may be selected for UAV-compliant elements of the packaging, as illustrated in FIG. 5. With reference to FIGS. 1-5, the UAV-compliant packaging 550 may include elements that make the UAV-compliant packaging 550 compatible with UAV transportation. For example, the UAV-compliant packaging 550 may include an aerodynamic profile, such as rounded edges 552. In addition, the UAV-compliant packaging 550 may include tear-away sections 553 or fold-lines 551 that allow the UAV-compliant packaging 550 to change shape and/or size. For example, by cutting or tearing along the tear-away sections 553, portions of the UAV-compliant packaging 550 may be removed and the separate parts of the UAV-compliant packaging 550 may be rejoined to form a smaller package. Other elements, such as circuit components 565 (e.g., pre-printed circuit tracer lines), may provide data to a processor onboard the UAV (e.g., 200) once on board.

Figure 6A:
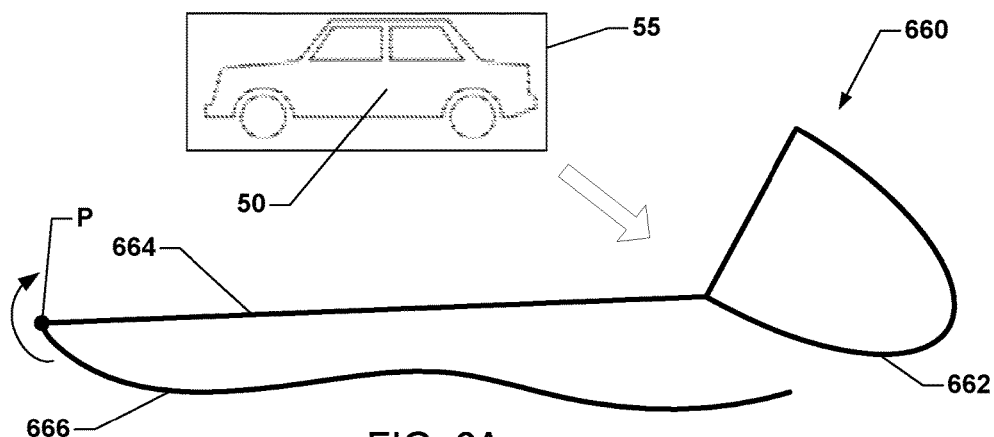
FIG. 6A is a schematic side elevation view of an item ready to be placed inside an unassembled UAV-compliant packaging according to various embodiments.
Figure 6B:
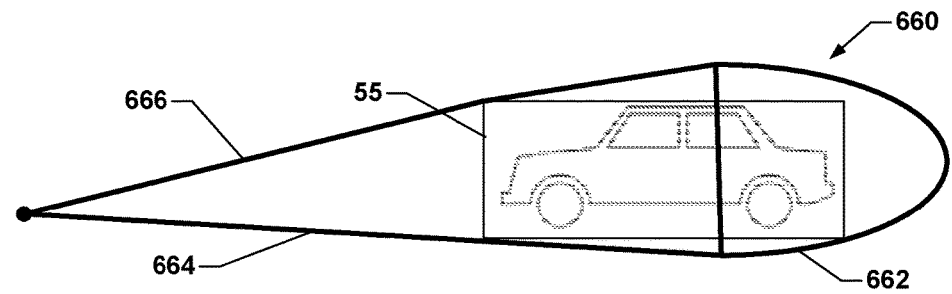
FIG. 6B is a schematic side elevation view of the item and UAV-compliant packaging of FIG. 6A with the UAV-compliant packaging assembled and the item placed inside according to various embodiments.

In various embodiments, UAV-compliant packaging 660, for instance as shown in FIGS. 6A-6B, may be adjusted to meet flight specifications for the UAV (e.g., 200), the order parameters, and/or to provide an aerodynamic outer profile of the UAV-compliant packaging 660. With reference to FIGS. 1-6B, the UAV-compliant packaging 660 is illustrated as an open packaging configured to receive one or more items. As illustrated, the UAV-compliant packaging 660 may be configured to receive the item 50, as well as the item's packaging 55, which is not very aerodynamic.

The UAV-compliant packaging 660 may include a rounded end 662, which forms a leading edge of an airfoil-type shape that may be aerodynamically advantageous. The UAV-compliant packaging 660 may also include an intermediate section 664 that is more rigid and a shape changing section 666. Once the item's packaging 55 is inserted into the rounded end 662, the intermediate section 664 may be pivoted towards the item's package 55. In addition, the shape changing properties of the shape changing section 666 may be activated so that the section may be rotated around pivot point P to cover the item's packaging 55 and then secured to the opposite side of the rounded end 662. The shape changing section 666 may deactivate to hold its shape as shown in FIG. 6B. Thus, once assembled with the item 50 and the item's packaging 55 inside, the UAV-compliant packaging 660 may have an aerodynamic profile in the shape of an airfoil.

Various embodiments include UAV components, such as motors, electronic speed controllers, propellers, frame components, electronic modules, a UAV-compliant packaging, etc., designed to be recycled or repurposed in whole or in part after delivery of the item. The UAV-compliant packaging and/or UAV components may be easily recycled (e.g., melted down for reuse in 3D printers) by a shipping agent, the recipient of the item (e.g., 50), or a recycling center at a designated location when delivered by the recipient of the item. For example, after delivery of the item, the UAV may return to the sender so that the UAV components and/or packaging can be recycled or repurposed. Recycled/repurposed UAV components and/or packaging may be selectively reused for subsequent delivery of another item.

Figure 7A:
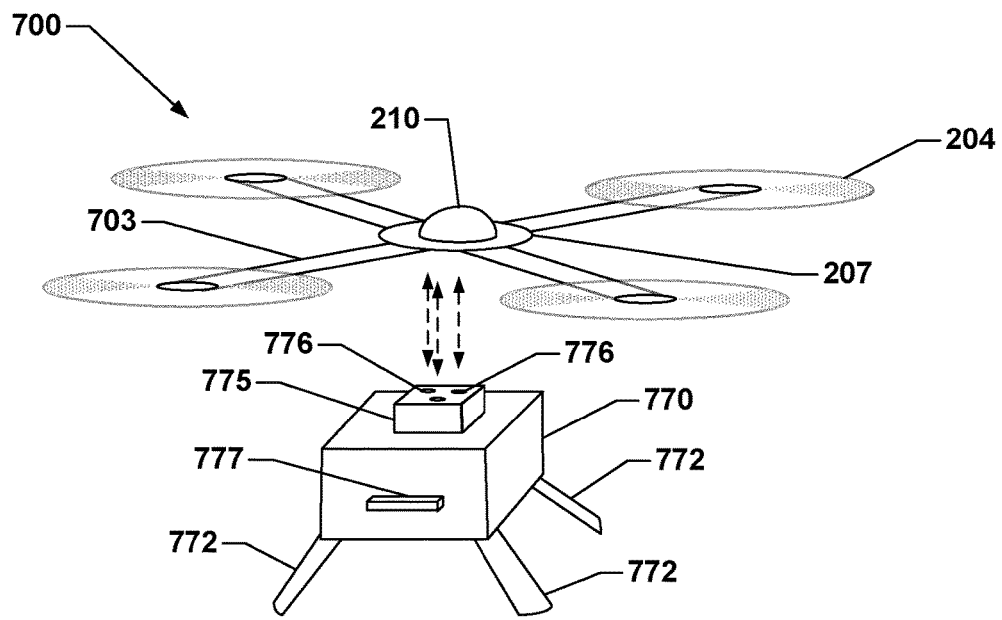
FIG. 7A is a perspective view of a UAV separate from UAV-compliant packaging that includes UAV components configured to form part of a frame of the UAV according to various embodiments.
Figure 7B:
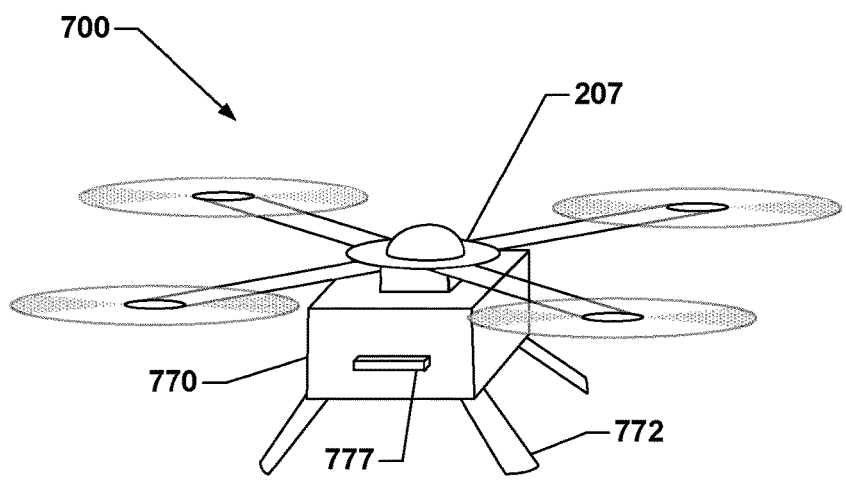
FIG. 7B is a perspective view of the UAV of FIG. 7A with the UAV-compliant packaging coupled to the UAV according to various embodiments.

Various embodiments include a delivery system for delivering an item using a UAV that includes UAV-compliant packaging with UAV components that form an integral and/or essential part of the UAV, as illustrated in FIGS. 7A-7B. With reference to FIGS. 1-7B, a delivery system 700 may include a basic UAV 207 (which may be similar to the UAV 200) with rotors 204, a basic frame 703, and a control unit 210, as well as other components. The basic UAV 207 may be configured to receive additional UAV components (e.g., landing struts 772, a power supply 775, and other components 777) for a particular mission, which additional components may be incorporated into a UAV-compliant packaging 770. The other components 777 may include (but is not limited to) pre-printed circuitry, a processor, memory, GPS, a sensor, an antenna, a transceiver, etc. The UAV-compliant packaging 770 may include mating elements 776 for receiving and securing the UAV-compliant packaging 770 to the basic UAV 207. The mating elements 776 may couple with corresponding elements on the basic UAV 207. In some embodiments, the mating elements 776 and/or the corresponding elements from the basic UAV 207 may include electrical conductors for transferring power from the power supply 775 to the basic UAV 207 or vise versa.

The basic UAV 207 may include sufficient basic UAV components to operate without the additional UAV components integrated into the UAV-compliant packaging 770 configured to hold one or more items (e.g., item 50 in FIG. 2). In this way, before the basic UAV 207 is secured to the UAV-compliant packaging 770, the basic UAV 207 may be configured to operate separately (e.g., take-off, fly, land, etc. without the need for added UAV components). In addition, after delivery of the UAV-compliant packaging 770 to a destination, if self sufficient, the basic UAV 207 may be configured to travel to another destination or return to a previously visited location or a location of origin.

Alternatively, the basic UAV 207 may require added UAV components, such as landing struts 772, a power supply 775, and other components 777, which if required may be considered essential parts of an advanced UAV that forms the delivery system 700.

Figure 8A:
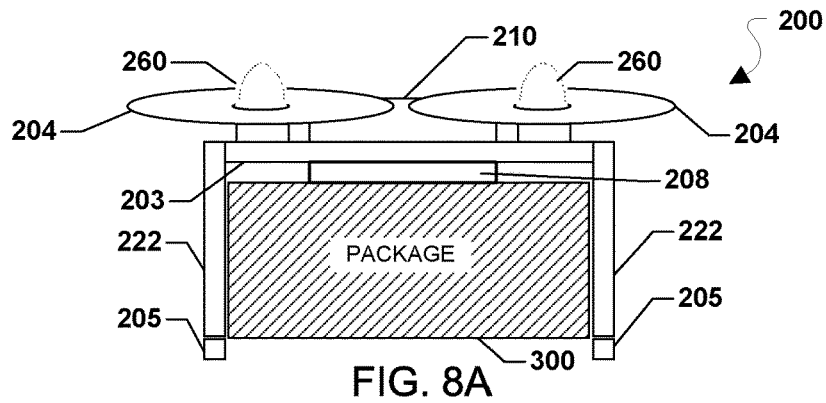
FIG. 8A is a schematic front elevation view of a UAV suitable for use in various embodiments.
Figure 8B:
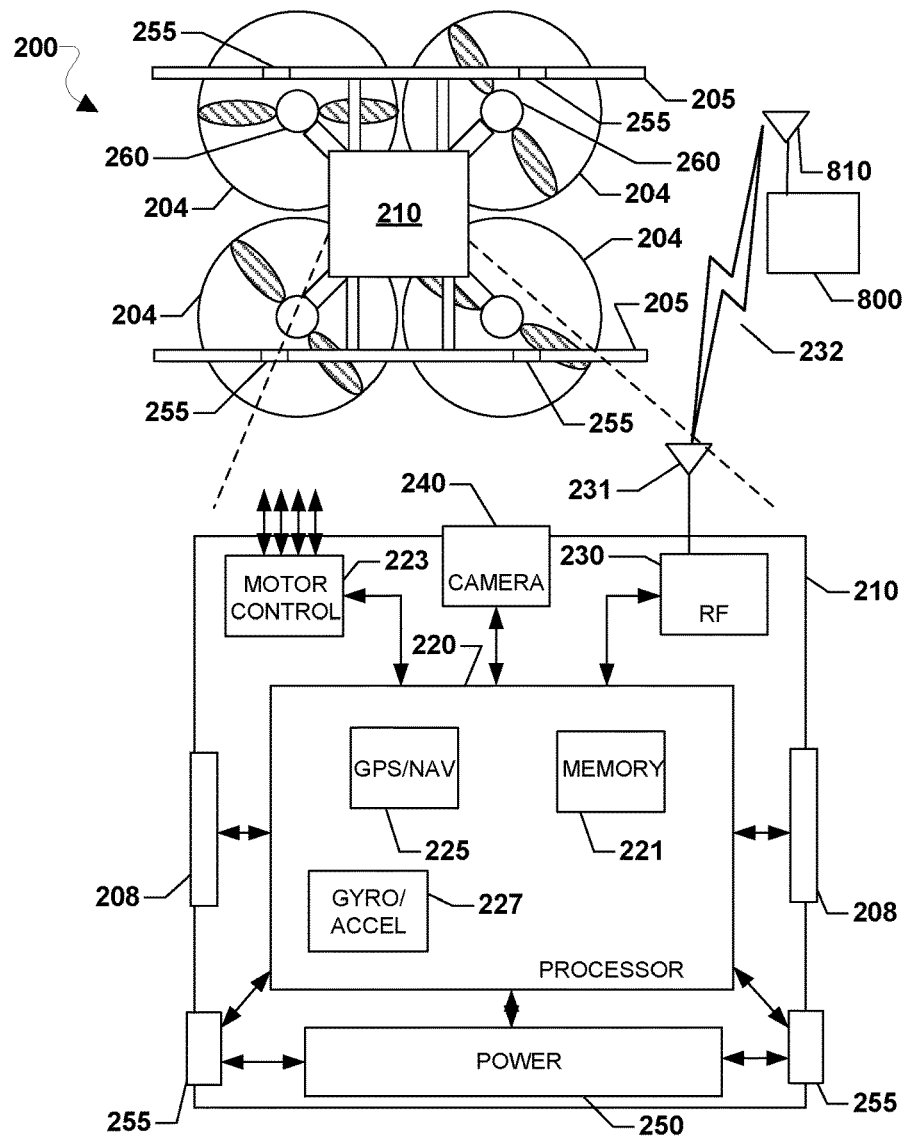
FIG. 8B is a schematic plan view of the UAV of FIG. 8A with a schematic relief diagram of a control unit and mobile computing device according to various embodiments.

Various embodiments may be implemented using a variety of UAV configurations, an example of which is illustrated in FIGS. 8A and 8B in the form of a quad copter. However, other types of UAVs may be used. A common UAV configuration suitable for use in the various embodiments may include a "quad copter" configuration.

FIGS. 8A and 8B illustrate a UAV suitable for use with various embodiments. With reference to FIGS. 1-8B, the UAV 200 may use various UAV components such as rotors 204 and flight motors 260 that may be fixed to a frame 203 and landing skids 205 that may support a full weight of the UAV 200. In various embodiments, the UAV 200 may be configured to secure a package, such as UAV-compliant packaging 300, as illustrated in FIGS. 8A and 8B. The UAV 200 may include a package-securing unit 208 for securing the UAV-compliant packaging 300. The package-securing unit 208 may include a gripping and release mechanism or motor that may be rated sufficiently to grasp and hold the UAV-compliant packaging 300. For example, the package-securing unit 208 may include a motor that drives a gripping and release mechanism and controls, which may be responsive to grip and release the UAV-compliant packaging 300 at appropriate times, such as when instructed by a control unit 210. Optionally, the UAV-compliant packaging 300 may be enclosed by the frame 203 and landing skids 205 underneath the flight motors 260 or rotors 204.

A quad copter-type horizontal rotor UAV (e.g., 200) may fly in any unobstructed horizontal and vertical direction or may hover in one place. The UAV 200 may be configured with processing and communication devices that enable the UAV 200 to navigate, such as by controlling the flight motors to achieve flight directionality and to receive position information and information from other system components including vehicle systems, package delivery service servers and so on. The position information may be associated with the current UAV position and the location of the UAV destination or position information obtained regarding destinations, locations of charging stations, etc.

For ease of description and illustration, some details of the UAV 200 are omitted, such as wiring, frame structure interconnects or other features that would be known to one of skill in the art. For example, while the UAV 200 is shown and described as having frame members, such as the frame 203. The UAV 200 may be constructed with a molded frame in which support is obtained through the molded structure. In various embodiments, the UAV 200 may have four rotors 204. However, more or fewer of the rotors 204 may be included.

In various embodiments, the UAV 200 may be configured to receive an external source of power for recharging. The landing skids 205 of the UAV 200 may be provided with charging terminals 255. The charging terminals 255 may provide a connection between the battery of the UAV 200 and an external source of charging power. The charging terminals 255 may be arranged such that some are configured with one polarity and others configured with an opposite polarity, corresponding to which battery terminal the particular one of the charging terminals 255 is connected. The polarity of the charging terminals 255 may also be coordinated with the location and polarity of the corresponding charging connections on a docking station to which the charging terminals connect to once the UAV 200 is in a docked position. In various embodiments, the charging terminals may provide additional connections with a docking station such as wired communication or control connections. In various embodiments, the delivery UAV and the candidate vehicle may provide means for wireless/inductive charging of the UAV's battery. The UAV 200 may further include a control unit 210 that may house various circuits and devices used to power and control the operation of the UAV 200, including flight motors 260 for powering the rotors 204, a battery, a communication module and so on as described.

The control unit 210 may include a processor 220, a radio frequency (RF) module 230, and a power module 250. The processor 220 may include a memory 221, a global positioning system (GPS) navigation unit 225, and sufficient processing power to conduct various control and computing operations for controlling the UAV 200 and UAV subsystems. The processor 220 may be coupled to the package-securing unit 208 and the charging terminals 255. The processor 220 may be directly powered during docking from the charging terminals 255 or may be powered from the power module 250 or a combination. Further, the processor 220 may control the charging of the power module 250, such as by being equipped with charging control algorithm and a charge control circuit. The processor 220 may be coupled to a motor control unit 223 that manages the flight motors 260 that drive the rotors 204.

The power module 250 may include one or more batteries that may provide power to various components, including the processor 220, the flight motors 260, the package-securing unit 208, and the RF module 230. In particular, the batteries included in the power module 250 may be rechargeable and coupled to the flight motors 260 that are configured to function as generators when the rotors 204 are turned by wind. The processor 220 may be configured with processor-executable instructions to control the charging of the power module 250 (i.e., the storage of energy supplied by the docking station or harvested energy while docked to the docking station) by the flight motors 260 and/or by the charging terminals 255, such as by executing a charging control algorithm using a charge control circuit. Alternatively or additionally, the power module 250 may be configured to manage its own charging by regulating power received from the flight motors 260, and/or power received from the charging terminals 255, that is applied to recharging batteries.

Through control of each one of the flight motors 260 connected to the rotors 204, the UAV 200 may control flight toward a UAV destination. The processor 220 may receive input from the GPS navigation unit 225 in order to determine its present position, a position of a UAV destination, and other positions, such as a position of a landing point. A gyro/accelerometer unit 227 may also be provided to generate relative position information about the three-dimensional orientation and movement of the UAV 200. The processor may also receive input from a camera unit 240, such a camera unit that provides stereoscopic images, in order to facilitate navigation. For example, the processor may use images from a camera unit 240 to follow or navigate the UAV 200 toward an identified feature, such as a road intersection, or to identify obstacles that the UAV should avoid.

In various embodiments, the control unit 210 of the UAV 200 may be equipped with the camera unit 240, which may be used for a variety of applications. For example, the camera unit 240 may be used for vehicle identification, guiding the UAV to landing on a docking mechanism, photographing or identifying the recipient of the package, and so on.

The processor 220 may communicate with a mobile computing device 800 through the RF module 230. A bi-directional wireless link 232 may be established between onboard antenna 231 of the RF module 230 and a mobile computing device antenna 810 of the mobile computing device 800. The RF module 230 may be configured to receive GPS signals from a satellite or other signals used by the UAV 200. The mobile computing device 800 may be a device associated with a user controlling the UAV 200. The mobile computing device 800 may alternatively be a server associated with the package delivery service or operator of the UAV 200. The RF module 230 may support communications with multiple ones of the mobile computing device 800. While the various components of the control unit 210 are shown as separate components, in various embodiments some of the electronic components, such as the processor 220, the motor control unit 223, the RF module 230, and possibly other units, may be integrated together in a single device, chip circuit board or system-on-chip.

Various aspects, such as communication with the UAV 200 through a Docking App, may be implemented in any of a variety of mobile computing devices (e.g., smartphones, tablets, smartwatches, etc.). The mobile computing device 800 may include a processor coupled with the various systems of the mobile computing device 800 for communication with and control thereof. For example, the processor may be coupled to a touch screen controller, radio communication elements, speakers and microphones, and an internal memory. The processor may be one or more multi-core integrated circuits designated for general or specific processing tasks. The internal memory may be volatile or non-volatile memory, and may be secure and/or encrypted memory, or unsecure and/or unencrypted memory, or any combination thereof. In another embodiment (not shown), the mobile computing device 800 may also be coupled to an external memory, such as an external hard drive.

The mobile computing device 800 may have one or more radio signal transceivers (e.g., Peanut, Bluetooth, Bluetooth LE, ZigBee, Wi-Fi®, radio frequency (RF) radio, etc.) and antennae, the mobile computing device antenna 810, for sending and receiving communications, coupled to each other and/or to the processor. The radio signal transceivers and the mobile computing device antenna 810 may be used with the above-mentioned circuitry to implement the various wireless transmission protocol stacks and interfaces. The mobile computing device 800 may include a cellular network wireless modem chip coupled to the processor that enables communication via a cellular network.

Various forms of computing devices may implement the various embodiments to customize a UAV and packaging to deliver an item, including personal computers, mobile computing devices (e.g., smartphones, etc.), servers, laptop computers, etc., to implement the various embodiments including the embodiments described with reference to FIGS. 1-9. Such computing devices may typically include, at least, the components illustrated in FIG. 9, which illustrates an example server computing device. With reference to FIGS. 1A-9, the server 900 may typically include a processor 901 coupled to volatile memory 902 and large capacity nonvolatile memory 903, 904, such as a disk drive. The server 900 may also include a floppy disc drive, compact disc (CD) or digital versatile disc (DVD) disc drive coupled to the processor 901. The server 900 may also include network access ports 905 (or interfaces) coupled to the processor 901 for establishing data connections with a network, such as the Internet and/or a local area network coupled to other system computers and servers. Similarly, the server 900 may include additional access ports 906, such as USB, Firewire, Thunderbolt, and the like for coupling to peripherals, external memory, or other devices.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method of delivering an item using an unmanned autonomous vehicle (UAV), comprising:
   receiving, in a processor, an electronic order for an item;
   determining, by the processor, order parameters based on the electronic order identifying the item and details regarding delivery of the item;
   selecting, by the processor, UAV components for operating the UAV based on UAV parameters meeting the determined order parameters;
   determining, by the processor, UAV-compliant packaging parameters for transporting the item carried by the UAV, wherein the UAV-compliant packaging parameters enable the UAV to meet at least some of the determined order parameters and the UAV parameters;
   coordinating, by the processor, assembly of the UAV including the selected UAV components and selected UAV-compliant packaging with the item therein, wherein the selected UAV-compliant packaging meets the determined UAV-compliant packaging parameters; and
   dispatching the assembled UAV for delivering the item.

2. The method of claim 1, further comprising:
determining dimensions of the item, wherein the determined UAV-compliant packaging parameters are based on the determined dimensions of the item.

3. The method of claim 2, further comprising:
shaping the selected UAV-compliant packaging to conform to the determined dimensions of the item.

4. The method of claim 1, wherein coordinating assembly of the UAV includes adjusting a packaging structure of the selected UAV-compliant packaging.

5. The method of claim 4, wherein adjusting the packaging structure further comprises:
applying an altering agent to a material portion of the packaging structure, wherein the altering agent is selected from a group consisting of electromagnetic energy, temperature, mechanical energy, electrical energy, magnetic energy, or chemical energy.

6. The method of claim 4, wherein adjusting the packaging structure further comprises:
applying an altering agent to a material portion of the packaging structure; and
pressing the item into the material portion to conform the packaging structure to a shape of the item.

7. The method of claim 4, wherein adjusting the packaging structure further comprises:
changing a shape of a material forming the selected UAV-compliant packaging, wherein the material is configured to hold the changed shape of the material forming the selected UAV-compliant packaging.

8. The method of claim 1, wherein the selected UAV-compliant packaging is formed at least in part using three-dimensional (3D) printing methods.

9. The method of claim 1, wherein the received electronic order includes more than one item, wherein the selected UAV-compliant packaging is selected to contain the more than one item included in the received electronic order.

10. The method of claim 1, wherein the selected UAV-compliant packaging includes UAV elements selected from a group consisting of circuit components and mating elements for securing the selected UAV-compliant packaging to one or more UAV components.

11. The method of claim 1, wherein the selected UAV-compliant packaging includes at least one of the selected UAV components.

12. The method of claim 1, further comprising:
determining, in the processor, whether the item includes pre-supplied packaging; and
determining, in the processor, whether the pre-supplied packaging meets the determined UAV-compliant packaging parameters in response to determining the item includes the pre-supplied packaging, wherein the selected UAV-compliant packaging comprises the pre-supplied packaging in lieu of added packaging elements in response to determining the pre-supplied packaging meets the determined UAV-compliant packaging parameters.

13. The method of claim 1, wherein the selected UAV-compliant packaging is selected to protect the item from a predetermined environment associated with the delivery of the item.

14. The method of claim 1, wherein the selected UAV-compliant packaging is selected to handle at least one selected mode of travel and a travel route.

15. The method of claim 1, wherein the selected UAV-compliant packaging is formed at least partially from a frozen liquid.

16. The method of claim 1, wherein the determined order parameters are selected from a group consisting of a timing of delivery, when the electronic order was placed, where the electronic order was placed, when delivery of the item is expected, when delivery of the item is guaranteed, a location of delivery, a travel route for delivery, current weather conditions, predicted weather conditions, travel time, a perishability of the item, a required item protection, one or more types of packaging, a desired item protection, a monetary value of the item, and a cost to deliver the item.

17. The method of claim 1, wherein a destination for delivery of the item in the received electronic order transports the item between commonly owned or controlled locations.

18. The method of claim 1, wherein selecting UAV components includes manufacturing or assembling parts to form at least one of the selected UAV components.

19. A delivery system for delivering an item using an unmanned autonomous vehicle (UAV), comprising:
a computing device maintaining an electronic order for an item; and
one or more processors coupled to the computing device, the one or more processors configured to:
receive the electronic order;
determine order parameters based on the electronic order identifying the item and details regarding delivery of the item;
select UAV components for operating the UAV based on UAV parameters meeting the order parameters;
determine UAV-compliant packaging parameters for transporting the item carried by the UAV, wherein the UAV-compliant packaging parameters enable the UAV to meet at least some of the order parameters and the UAV parameters;
coordinate assembly of the UAV including the selected UAV components and selected UAV-compliant packaging with the item therein, wherein the selected UAV-compliant packaging meets the determined UAV-compliant packaging parameters; and
dispatch the assembled UAV and packaging for delivering the item.

20. The delivery system of claim 19, further comprising:
a form configured to shape packaging, wherein the one or more processors are further configured to determine dimensions of the item, wherein the determined UAV-compliant packaging parameters are based on the determined dimensions of the item.

21. The delivery system of claim 20, wherein the form is configure to shape the selected UAV-compliant packaging to conform to the determined dimensions of the item.

22. The delivery system of claim 19, wherein the one or more processors are further configured to assemble the UAV by adjusting a packaging structure of the selected UAV-compliant packaging to meet flight specifications for the UAV.

23. The delivery system of claim 19, further comprising:
a three-dimensional (3D) printer coupled to the one or more processors, wherein the one or more processors are configure to form the selected UAV-compliant packaging at least in part using 3D printer.

24. The delivery system of claim 19, wherein the one or more processors are further configured to determine the UAV-compliant packaging parameters to contain more than one item when more than one item is included in the received electronic order.

25. The delivery system of claim 19, wherein the one or more processors are further configured to:

determine whether the item includes pre-supplied packaging; and determine whether the pre-supplied packaging meets the determined UAV-compliant packaging parameters in response to determining the item includes the pre-supplied packaging, wherein the selected UAV-compliant packaging comprises the pre-supplied packaging in lieu of added packaging elements in response to determining the pre-supplied packaging meets the determined UAV-compliant packaging parameters.

26. The delivery system of claim 19, wherein the one or more processors are further configured to select the selected UAV-compliant packaging for transporting the item carried by the UAV based on a material property of the selected UAV-compliant packaging.

27. The delivery system of claim 19, wherein the order parameters are selected from a group consisting of a timing of delivery, when the electronic order was placed, when delivery of the item is expected, when delivery of the item is guaranteed, a location of delivery, a travel route for delivery, current weather conditions, predicted weather conditions, travel time, a perishability of the item, a required item protection, one or more types of packaging, a desired item protection, a monetary value of the item, and a cost to deliver the item.

28. The delivery system of claim 19, wherein the selected UAV components are manufactured or assembled parts to form at least one of the selected UAV components in response to the order parameters being determined.

29. A delivery system for delivering an item using an unmanned autonomous vehicle (UAV), comprising:

means for receiving an electronic order for an item;

means for determining order parameters based on the electronic order identifying the item and details regarding delivery of the item;

means for selecting UAV components for operating the UAV based on UAV parameters meeting the determined order parameters;

means for determining UAV-compliant packaging parameters for transporting the item carried by the UAV, wherein the UAV-compliant packaging parameters enable the UAV to meet at least some of the determined order parameters and the UAV parameters;

means for coordinating assembly of the UAV including the selected UAV components and selected UAV-compliant packaging with the item therein, wherein the selected UAV-compliant packaging meets the determined UAV-compliant packaging parameters; and means for dispatching the assembled UAV and packaging for delivering the item.

30. A non-transitory processor-readable storage medium having stored thereon processor-executable instructions configured to cause a processor to perform operations comprising:

receiving an electronic order for an item;

determining order parameters based on the electronic order identifying the item and details regarding delivery of the item;

selecting UAV components for operating the UAV based on UAV parameters meeting the determined order parameters;

determining UAV-compliant packaging parameters for transporting the item carried by the UAV, wherein the UAV-compliant packaging parameters enable the UAV to meet at least some of the determined order parameters and the UAV parameters;

coordinating assembly of the UAV including the selected UAV components and selected UAV-compliant packaging with the item therein, wherein the selected UAV-compliant packaging meets the determined UAV-compliant packaging parameters; and dispatching the assembled UAV and packaging for delivering the item.

* * * * *